(12) United States Patent
Fukuta

(10) Patent No.: US 10,291,168 B2
(45) Date of Patent: May 14, 2019

(54) POWER CONVERSION CONTROL APPARATUS

(71) Applicant: DENSO CORPORATION, Kariya, Aichi-pref. (JP)

(72) Inventor: Junichi Fukuta, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/190,464

(22) Filed: Jun. 23, 2016

(65) Prior Publication Data

US 2016/0380563 A1 Dec. 29, 2016

(30) Foreign Application Priority Data

Jun. 26, 2015 (JP) .................. 2015-128394

(51) Int. Cl.
*H02M 5/293* (2006.01)
*H02P 27/08* (2006.01)
*H02M 1/32* (2007.01)
*H02M 7/5387* (2007.01)
*B60L 3/00* (2019.01)
(Continued)

(52) U.S. Cl.
CPC ............ *H02P 27/085* (2013.01); *B60L 3/003* (2013.01); *B60L 15/007* (2013.01); *H02M 1/32* (2013.01); *H02M 7/53871* (2013.01); *B60L 2210/30* (2013.01); *B60L 2210/40* (2013.01); *B60L 2240/421* (2013.01); *B60L 2240/429* (2013.01); *B60L 2240/526* (2013.01); *B60L 2240/527* (2013.01); *B60L 2240/529* (2013.01); *B60L 2240/547* (2013.01); *H02M 2001/007* (2013.01); *Y02T 10/644* (2013.01); *Y02T 10/645* (2013.01); *Y02T 10/7241* (2013.01)

(58) Field of Classification Search
CPC ........... B60L 15/007; H02M 2001/007; H02M 7/53871; H02P 27/085
See application file for complete search history.

(56) References Cited

U.S. PATENT DOCUMENTS

2005/0128671 A1 6/2005 Miyamoto
2005/0146295 A1 7/2005 Miyamoto et al.
(Continued)

FOREIGN PATENT DOCUMENTS

JP 3052792 B2 6/2000
JP 2004-112916 A 4/2004

*Primary Examiner* — Muhammad S Islam
(74) *Attorney, Agent, or Firm* — Oliff PLC

(57) ABSTRACT

In a power conversion control apparatus incorporated in a power conversion system for converting a direct current (DC) voltage output from a converter into an alternating current (AC) using an inverter. The power conversion control apparatus includes a converter drive circuit configured to drive the converter, an inverter drive circuit, and a control electronic control unit (ECU). The inverter drive circuit operates a plurality of switching elements forming the inverter at a variably set switching speed. The control ECU outputs to the converter drive circuit an input voltage change command for changing an input voltage command for an input voltage to be output from the converter and input to the inverter. The control ECU outputs to the inverter drive circuit a drive command for driving the plurality of switching elements and a switching speed change command for changing the switching speed for the plurality of switching elements.

14 Claims, 12 Drawing Sheets

(51) Int. Cl.
*B60L 15/00* (2006.01)
*H02M 1/00* (2006.01)

(56) References Cited

U.S. PATENT DOCUMENTS

| | | | |
|---|---|---|---|
| 2013/0107595 A1* | 5/2013 | Gautier | H02P 27/085 |
| | | | 363/124 |
| 2013/0229209 A1* | 9/2013 | Miyauchi | H03K 17/56 |
| | | | 327/109 |
| 2014/0001839 A1 | 1/2014 | Kakimoto | |
| 2015/0244301 A1* | 8/2015 | Sato | H02P 27/06 |
| | | | 318/139 |

* cited by examiner

POWER CONVERSION CONTROL APPARATUS

CROSS-REFERENCE TO RELATED APPLICATION

This application is based on and claims the benefit of priority from earlier Japanese Patent Application No. 2015-128394 filed Jun. 26, 2015, the descriptions of which are incorporated herein by reference.

BACKGROUND (Technical Field)

The present invention relates to a power conversion control apparatus incorporated in a power conversion system for converting a direct current (DC) voltage output from a converter into an alternating current (AC) using an inverter.

(Related Art)

Conventionally, techniques are known for variably controlling a switching speed for a plurality of semiconductor switching elements forming an inverter. In general, a lower switching speed can more reduce a surge voltage associated with switching operations, thereby prevent breakdown of the switching elements. However, loss reduction in the witching elements requires a higher switching speed. Therefore, it is required to change the switching speed properly depending on the situations.

An inverter apparatus disclosed in Japanese Patent No. 3052792 is configured to change the switching speed for the switching elements when a voltage of a DC power source applied to a gate drive circuit has reached a given threshold.

A power converter apparatus disclosed in Japanese Patent Application Laid-Open Publication No. 2014-11817 is configured such that a gate control circuit (an electronic control unit (ECU)) changes the switching speed for the switching elements based on an input voltage.

The inverter apparatus disclosed in Japanese Patent No. 3052792 is not configured such that a controller (being a control ECU) commands a switching speed change to the gate drive circuit. Therefore, the controller is unable to obtain any information about the switching speed.

A power converter disclosed in Japanese Patent Application Laid-Open Publication No. 2014-11817 is configured such that the gate control circuit changes the switching (SW) speed. The power converter apparatus disclosed in Japanese Patent Application Laid-Open Publication No. 2014-11817 is only configured to, based on results of the input voltage, change the SW speed. That is, it is not mentioned at what timing the switching speed is to be changed in response to the input voltage change command.

If the switching speed is changed without taking into account switching speed change timing, a high input voltage and high switching speed situation is likely to occur due to a reaction delay of the speed changing circuit, which may cause breakdown of the switching elements.

In consideration of the foregoing, exemplary embodiments of the present invention are directed to providing a power conversion control apparatus capable of properly changing a switching speed for switching elements to meet breakdown prevention and loss reduction needs.

SUMMARY

In accordance with an exemplary embodiment of the present invention, there is provided a power conversion control apparatus incorporated in a power conversion system for converting a direct current (DC) voltage output from a converter into an alternating current (AC) using an inverter.

The power conversion control apparatus is configured to control drive of the converter and the inverter, and includes a converter drive circuit configured to drive the converter, an inverter drive circuit, and a control electronic control unit (ECU).

The inverter drive circuit is configured to operate a plurality of switching elements forming the inverter at a variably set switching speed. Means for changing the switching speed for the switching elements forming the inverter may include switching a plurality of gate resistors or gate voltages or may be constant-current driven or constant-voltage driven.

The control ECU is configured to output to the converter drive circuit an input voltage change command for changing an input voltage command for an input voltage to be output from the converter and input to the inverter. The control ECU is further configured to output to the inverter drive circuit a drive command for driving the plurality of switching elements and a switching speed change command for changing the switching speed for the plurality of switching elements.

The control ECU not only outputs the input voltage change command to the converter drive circuit, but also outputs the switching speed change command to the inverter drive circuit. This allows the control ECU to properly adjust timings for outputting the input voltage change command and the switching speed change command. Therefore, depending on whether to prioritize prevention of breakdown of the switching elements or loss reduction, the switching speed is allowed to be property changed.

DESCRIPTION OF SPECIFIC EMBODIMENTS

With reference to the accompanying drawings, hereinafter are described several embodiments of the present invention. Substantially common elements or steps throughout the embodiments are assigned the same numbers and will not be redundantly described.

In the following descriptions, a power conversion control apparatus in accordance with each of these embodiments may be applied to a power conversion system for driving a motor generator that is a power source of a hybrid vehicle or an electrical vehicle.

Figure 1:
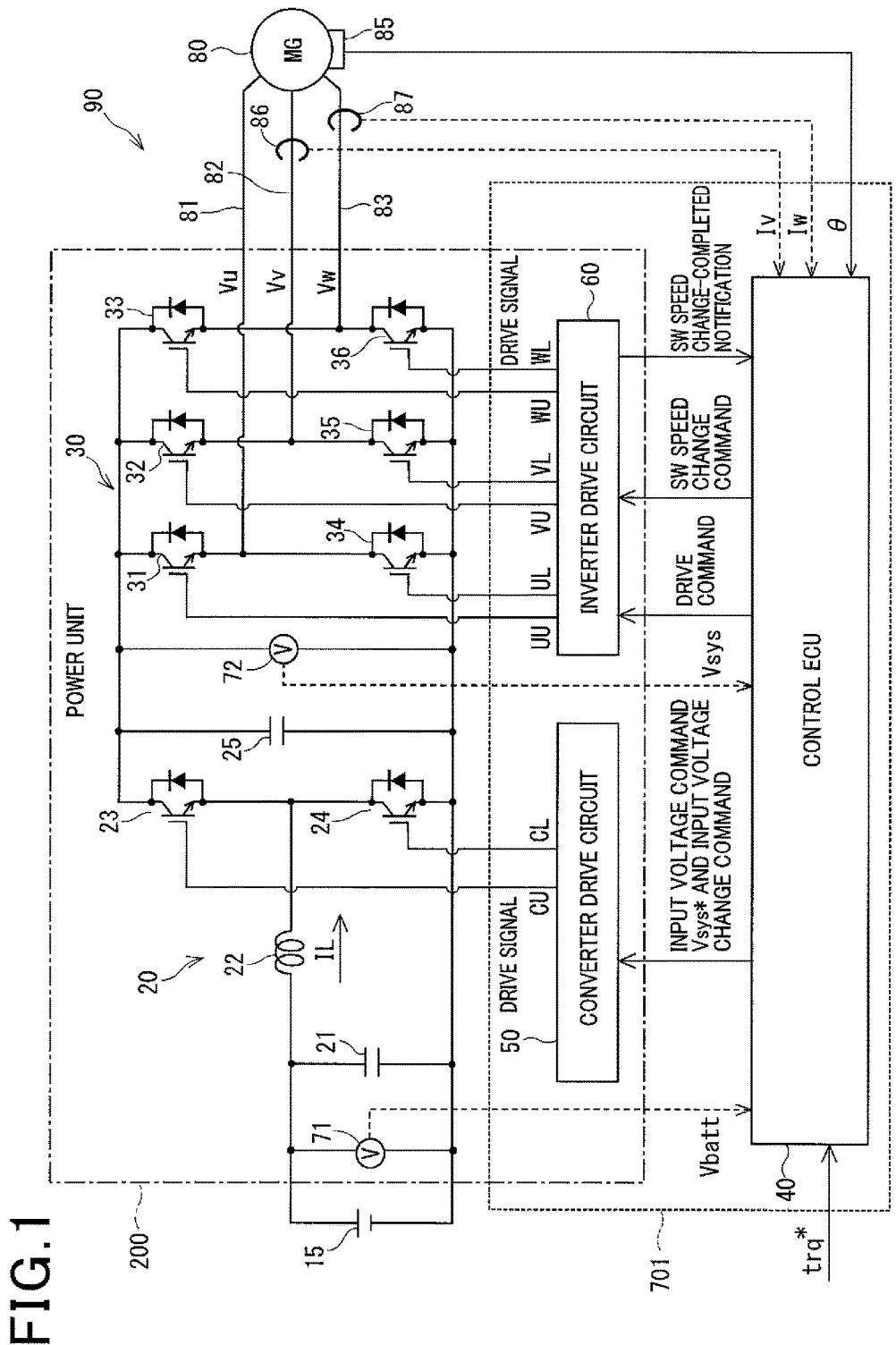
FIG. 1 is a schematic diagram of a power conversion system including a power conversion control apparatus in accordance with each of first to fourth embodiments.

FIG. 1 shows a power conversion system incorporating the power conversion control apparatus in accordance with each of first to fourth embodiments. The power conversion system 90 includes a boost converter 20 configured to step up a direct-current (DC) voltage of a battery 15, and an inverter 30 configured to convert the stepped up DC voltage into an alternating-current (AC) and apply the AC voltage to an electrical load. In each of the first to fourth embodiments, the electrical load for the inverter 30 is a motor generator 80 (denoted by MG).

The voltage stepped-up voltage output from the converter 20 is an input voltage Vsys into the inverter 30. The input voltage Vsys also refers to a system voltage.

The battery 15 may be a rechargeable secondary battery, such as a nickel-metal-hydride battery, a lithium-ion battery or the like. Instead of the battery, an electrical double layer capacitor or the like may be used as a DC power source.

The converter 20 is a boost converter operational to step up a battery voltage Vbatt of the battery 15 to the input voltage Vsys during powering operation.

The converter 20 includes a plurality of semiconductor switching elements and is driven by operating the switching elements in response to drive commands issued from a drive circuit 50. The inverter 30 also includes a plurality of semiconductor switching elements and is driven by operating the switching elements in response to drive commands issued from a drive circuit 60. Each of the switching elements may be an insulated gate bipolar transistor (IGBT) and is connected in parallel with a freewheeling diode that allows a current flow from a low side to a high side.

The converter 20 steps up the battery voltage Vbatt by alternately storing and releasing energy in a reactor 22 via switching operations of high-side (upper-arm) and low-side (lower-arm) converter switching (SW) elements 23, 24.

When the upper-arm converter SW element 23 is off and the lower-arm converter SW element 24 is on, energy is stored in the reactor 22 by current IL flowing through the reactor 22.

When the upper-arm converter SW element 23 is on and the lower-arm converter SW element 24 is off, the energy stored in the reactor 22 will be released. This gives rise to a stepped up voltage (being an input voltage Vsys) that is an induced voltage in the reactor 22 superimposed on the battery voltage Vbatt. This input voltage Vsys will be applied to a smoothing capacitor 25. Thus, the smoothing capacitor 25 will be charged.

A filter capacitor 21 provided at the input of the converter 20 is operative to remove power supply noise from the battery 15.

The inverter 30 includes six lower-arm and upper-arm inverter SW elements 31-36. More specifically, the inverter SW elements 31, 32, 33 are U-phase, V-phase, and W-phase upper-arm SW elements. The inverter SW elements 34, 35, 36 are U-phase, V-phase, and W-phase lower-arm SW elements. In the inverter 30, the respective U-phase, V-phase, and W-phase inverter SW elements 31-36 are driven under PWM control or phase control, thereby converting the direct-current (DC) power into three-phase AC power and supplies the three-phase AC power to a motor generator 80.

The motor generator 80 may be a permanent magnet synchronous motor or a three phase alternating current motor. The motor generator 80 serves not only as an electrical motor that generates a torque for driving a drive wheel, but also as an alternator to recover, as electrical energy, a torque transferred from an engine or the drive wheel.

The motor generator 80 has a stator with a U-phase winding 81, a V-phase winding 82, and a W-phase winding 83 therearound. Current sensors 86, 87 provided along the V-phase winding 82 and the W-phase winding 83 are operative to detect phase currents $I_V$, $I_W$. A rotation angle sensor 85 is operative to detect an electric angle θ of a rotor.

The power conversion control apparatus 701 includes a control ECU 40, a converter drive circuit 50 and an inverter drive circuit 60. The control ECU 40 is provided in a low-voltage operational section. The converter drive circuit 50 and the inverter drive circuit 60 are provided in a power unit 200 to which high voltages are applied.

The control ECU 40 is configured as a microcomputer including a central processing unit (CPU), a random access memory (RAM), a read only memory (ROM), an input/output interface, and a bus line connecting these components. The control ECU 40 performs software processing based control via the CPU executing computer programs stored in the ROM or the like, or hardware processing based control via a special purpose electronic circuit.

The control ECU 40 receives a torque command Trq* from a vehicle control circuit (not shown) and information about (or values of) phase currents Iv, Iw detected by the current sensors 86, 87 and a rotation angle θ detected by the rotation angle sensor 85. The control ECU 40 further receives information about (or values of) the battery voltage Vbatt detected by the battery voltage sensor 71 and the input voltage Vsys detected by the input voltage sensor 72. Based on these detected values, the control ECU 40 performs various control operations for driving the converter 20 and the inverter 30, and outputs results of the control operations to the converter drive circuit 50 and the inverter drive circuit 60.

The control ECU 40 outputs to the converter drive circuit 50 an input voltage command Vsys* for the input voltage Vsys, Typically, the input voltage command Vsys* is outputted as a target duty for the upper-arm and lower-arm converter SW elements 23, 24.

The input voltage command Vsys* is updated from time to time so as to assure power required to drive the invertor 30 in response to parameters, such as a requested torque that changes from time to time. In the present embodiment, attention is drawn to a command to change the input voltage command Vsys* (hereinafter referred to as an input voltage change command), rather than to an instantaneous static input voltage command Vsys. The control ECU 40 outputs to the converter drive circuit 50 the input voltage change command to change the input voltage command Vsys*. The concept of the input voltage change command includes input voltage commands Vsys* before and after the input voltage change.

The converter drive circuit 50 is configured to, routinely, based on the input voltage command Vsys* from the control ECU 40, generate a drive signal CU to operate the upper-arm converter SW element 23 and a drive signal CL to operate the lower-arm converter SW element 24. The converter drive circuit 50 outputs the drive signals CU, CL to gates of the converter SW elements 23, 24, respectively, to drive the converter 20.

The converter drive circuit 50 is further configured to, upon receipt of the input voltage change command, that is, when the input voltage command Vsys* is changed, change the drive signals CU, CL accordingly.

The control ECU 40 is configured to output to the inverter drive circuit 60 a drive command to operate the inverter SW elements 31-36. Typically, the control ECU 40 outputs a pulse-width modulation (PWM) pulse signal acquired by comparing a voltage command with a carrier as the drive command.

As described later, the inverter drive circuit 60 is allowed to change the SW speed for the inverter SW elements 31-36. The control ECU 40 outputs to the inverter drive circuit 60 a SW speed change command.

The inverter drive circuit 60 is configured to, routinely, based on the drive command from the control ECU 40, generate drive signals UU, VU, WU, UL, VL, WL and output to gates of the respective inverter SW elements 31-36 to thereby operate the inverter 30.

The inverter drive circuit 60 is configured to, upon receipt of the SW speed change command from the control ECU 40, change the SW speed for the inverter SW elements 31-36 and then output to the control ECU 40 a SW speed change-completed notification indicative of completion of the SW speed change.

Figure 2:
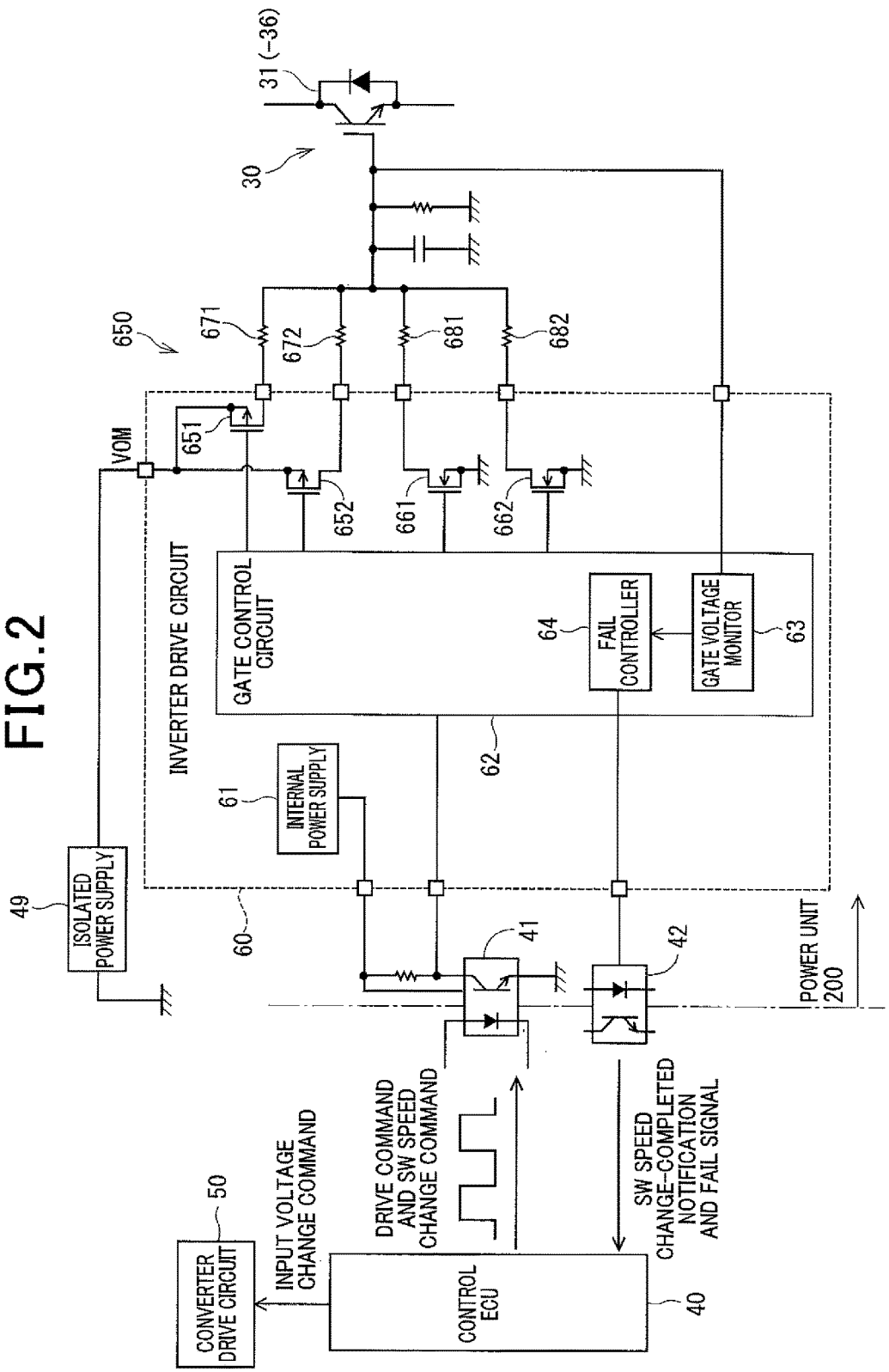
FIG. 2 is a diagram of an inverter drive circuit in the power conversion control apparatus of FIG. 1.

A more detailed configuration of the inverter drive circuit 60 will now be described with reference to FIG. 2.

The drive command and the SW speed change command from the control ECU 40 are input to a gate control circuit 62 of the inverter drive circuit 60 in the power unit 200 via a photocoupler 41. A switch of the photocoupler 41 is supplied with a voltage from an internal power supply 61.

The gate control circuit 62 outputs an operating voltage to the gate of each of the inverter SW elements 31-36. In FIG. 2, the inverter SW elements 31 is shown as a representative of the six inverter SW elements 31-36 is shown.

A SW speed changing circuit 650 for changing the SW speed for the inverter SW elements 31-36 may be configured to switch a plurality of gate resistors or gate voltages or may be constant-current driven or constant-voltage driven. FIG. 2 exemplary shows the constant-voltage driven SW speed changing circuit 650 configured to switch two gate resistors. In some embodiment, the SW speed changing circuit 650 may be configured to switch three or more gate resistors or continuously change the gate resistor. Each pair of upper-arm and lower-arm inverter SW elements need to be switched on and off in a complementary manner.

For example, for each pair of upper-arm and lower-arm inverter SW elements, when the upper-arm inverter SW element is on, the lower-arm inverter SW element is off, and when the upper-arm inverter SW element is off, the lower-arm inverter SW element is on. For each pair of upper-arm and lower-arm inverter SW elements, an on-speed for the upper-arm SW element and an off-speed for the lower-arm SW element are changed synchronously, where the on-speed and the off-speed do not have to be set to the strictly same speed, but a difference between the on-speed and the off-speed may be set to the to an extent permitted.

A reference voltage Vom is applied from an isolated power supply 49 to the SW speed changing circuit 650.

An on-drive circuit of the SW speed changing circuit 650 includes a plurality of on-drive (P-channel) FETs 651, 652 respectively connected to on-drive resistors 671, 672 having different resistance values. The gate control circuit 62 commands a gate signal to either one of the on-drive FETs 651, 652 to thereby change the on-speed for the inverter SW elements 31-36.

An off-drive circuit of the SW speed changing circuit 650 includes a plurality of off-drive (N-channel) FETs 661, 662 respectively connected to on-drive resistors 681, 682 having different resistance values. The gate control circuit 62 commands a gate signal to either one of the off-drive FETs 661, 662 to thereby change the off-speed for the inverter SW elements 31-36.

A gate voltage monitor 63 is configured to monitor whether or not a switch of the gate voltage caused by the operation of the SW speed changing circuit 650 has occurred. If no such switch of the gate voltage has occurred, the gate voltage monitor 63 notifies a fail controller 64 of a gate voltage fault.

In addition, the fail controller 64 is notified of a lower-arm and upper-arm short circuit fault detected by a sense cell (not shown) provided in each of the inverter SW elements 31-36. Upon occurrence of a fault, the fail controller 64 commands fail safe processing, such as off hold control, soft interruption control or the like.

The gate control circuit 62 is configured to, if the SW speed has been successfully switched, output a SW speed change-completed notification to the control ECU 40 via a photocoupler 42. If the fail controller 64 is notified of a fault, the gate control circuit 62 outputs a fail signal to the control ECU 40 via the photocoupler 42.

Conventionally, techniques are known that change the SW speed for the inverter SW elements depending on the situations.

In general, for each of the inverter SW elements, when the SW element is switched on or off, a surge voltage that is proportional to a time derivative of current will occur due to an abrupt current change. To prevent the surge voltage from exceeding a withstand voltage of the SW element and thus breaking down the SW element, it is advantageous to reduce the SW speed to suppress the surge voltage. However, the slowed SW speed will increase losses.

Therefore, in situations where there is a greater need for preventing the breakdown of the SW elements, it is advantageous to reduce the SW speed to thereby suppress the surge voltage. In situations where the breakdown of the SW elements is less likely to occur, it is advantages to increase the SW speed to thereby reduce the losses. In a power conversion system applicable to hybrid vehicles, loss reduction will lead to improved fuel economy.

As in the power conversion system 90 in accordance with each embodiment of the present invention, a power conversion system in which the input voltage Vsys stepped up in the converter 20 is input to the inverter 30 is able to estimate a withstand voltage margin for the SW elements in response to the input voltage Vsys.

Figure 3:
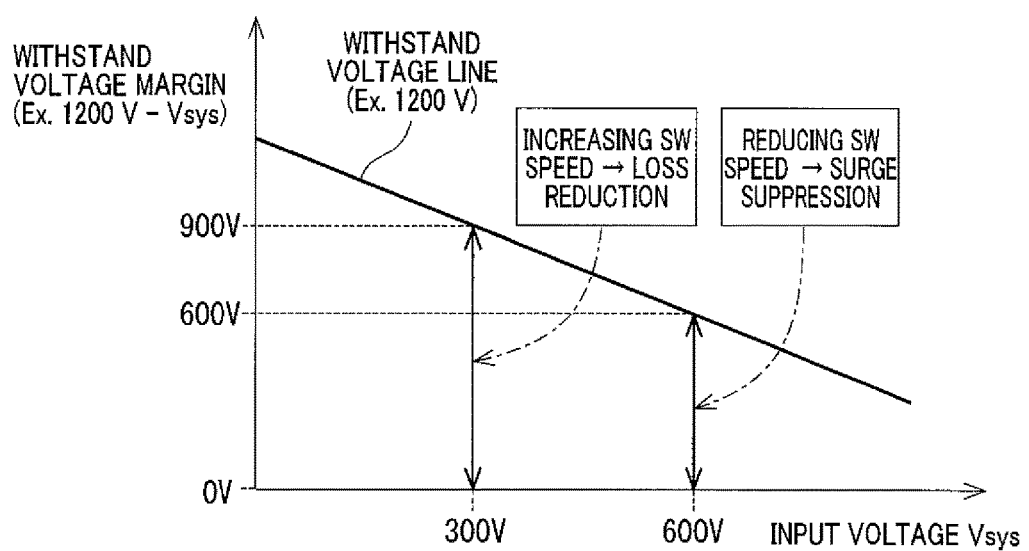
FIG. 3 is a relationship between input voltage and withstand voltage margin of switching elements.

As shown in FIG. 3, assuming that the withstand voltage is 1200 V, the withstand voltage margin is 900V for the input voltage Vsys of 300 V where 1200 V–300 V=900 V, and the withstand voltage margin is 600 V for the input voltage Vsys of 600 V where 1200 V–600 V=600 V.

For the input voltage Vsys of 300 V, the withstand voltage margin is relatively large. Therefore, it is possible to increase the SW speed and thereby reduce the losses. For the input voltage Vsys of 600 V, the withstand voltage margin is relatively small. Thus, it is necessary to reduce the SW speed and thereby suppress the surge voltage.

An inverter apparatus disclosed in Japanese Patent No. 3052792 is configured to change the SW speed when a voltage of a DC power source applied to the gate drive circuit has reached the threshold. This apparatus, however, is not configured to command a speed change from a controller (corresponding to the control ECU 40) to the gate drive circuit. That is, the gate drive circuit is only configured to change the SW speed along the way depending on the voltage of the DC power source, and the controller is unable to obtain information about the SW speed.

An apparatus as disclosed in Japanese Patent No. 4223379 is configured to change the SW speed when the voltage of the DC power source has reached the threshold and notify a higher-level ECU of a failure spare signal of a snubber circuit. As in the apparatus disclosed in Japanese Patent No. 3052792, the apparatus disclosed in Japanese Patent No. 4223379 is not configured to command a SW speed change from a controller. Therefore, the controller is unable to detect the SW speed change. In such a configuration, even if the controller restricts the control after outputting a fault signal, it is likely be belated.

An apparatus disclose in Japanese Patent No. 4120329 is configured to, based on a collector-emitter voltage, change the SW speed. With this configuration, however, the apparatus is unable to notify the higher-level ECU of the SW speed change, Thus, if the SW speed change mechanism fails, the SW speed will remain at a high speed, which may cause breakdown of the SW elements.

To overcome these disadvantages of the above known techniques, the power conversion control apparatus 701 in accordance with each embodiment is configured such that the control ECU 40 outputs the SW speed change command. More specifically, the control ECU 40 not only outputs the voltage change command to the converter drive circuit 50, but also outputs the SW speed change command to the inverter drive circuit 60. This allows the control ECU 40 to properly adjust and output both the input voltage change command and the SW speed change command.

The power conversion apparatus disclosed in Japanese Patent Application Laid-Open Publication No. 2014-11817 is configured such that the gate control circuit (ECU) changes the SW speed based on the input voltage. However, it is not disclosed that the gate control circuit outputs the input voltage command to the converter.

The apparatus disclosed in Japanese Patent Application Laid-Open Publication No. 2014-11817 is only configured to, based on results of the input voltage, change the SW speed. That is, it is not mentioned at what timing the SW speed is to be changed in response to the input voltage change command.

If the SW speed is changed without taking into account SW speed change timings, a high input voltage and high SW speed situation is likely to occur due to a reaction delay of the speed changing circuit, which may cause breakdown of the SW elements.

The individual embodiments of the present invention will now be described in more detail, regarding how the power conversion control apparatus 701 is configured to properly adjust both the input voltage change command and the speed change command.

First Embodiment

The first embodiment will now be described with reference to a timing diagram of FIG. 4 and flowcharts of FIGS. 5A and 5B.

Figure 4:
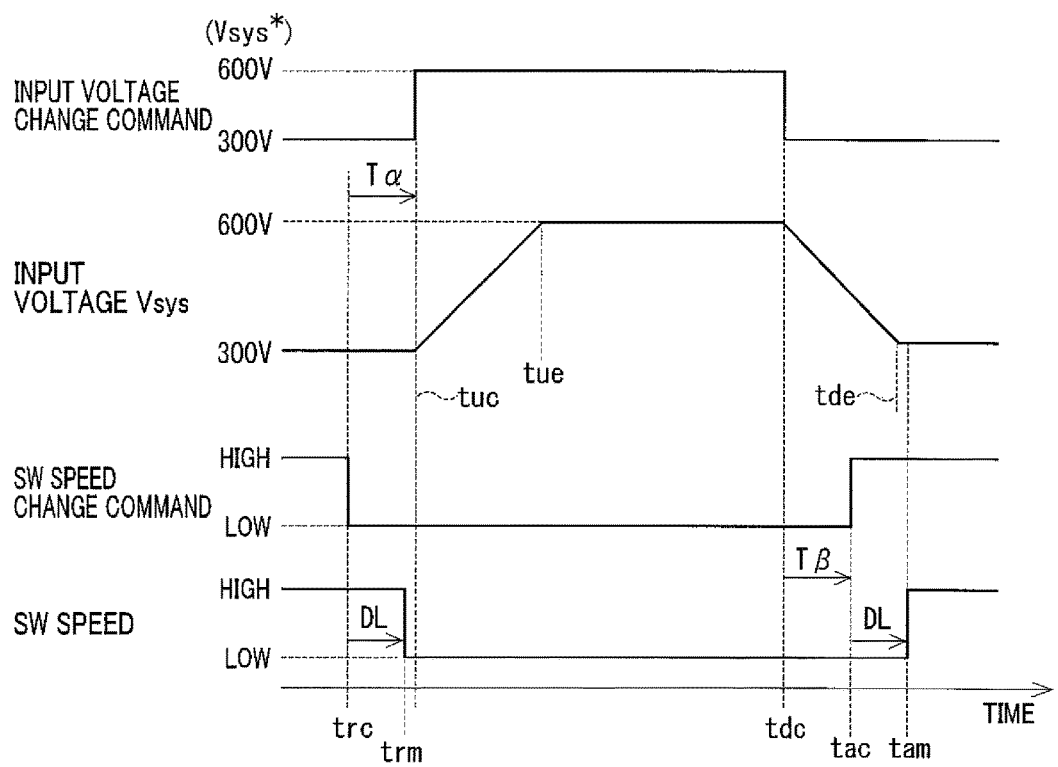
FIG. 4 is a timing diagram for an input voltage change command and a switching (SW) speed change command in accordance with the first embodiment.

The timing diagram of FIG. 4 shows an example of changes in various signals including, from the top, the input voltage change command from the control ECU 40 to the converter drive circuit 50, an actual value of the input voltage Vsys, the SW speed change command from the control ECU 40 to the inverter drive circuit 60, and an actual value of the SW speed.

A simple example of the input voltage change command is shown for changing the input voltage command Vsys* in two steps between 300 V (as a low side voltage) and 600 V (as a high side voltage). Practically, the input voltage command Vsys* may be changed in multiple steps.

Hereinafter, an input voltage change command for changing the input voltage command Vsys* from the low side voltage to the high side voltage (e.g., from 300 V to 600 V) is referred to as a step-up command, and an input voltage change command for changing the input voltage command Vsys* from the high side voltage to the low side voltage (e.g., from 600 V to 300 V) is referred to as a step-down command. In the timing diagram of FIG. 4, the operation of outputting the step-up command is followed by the operation of outputting step-down command.

After the input voltage change command is output, an actual value of the input voltage Vsys changes gradually for a certain amount of time. Hereinafter, a rate of change at which the input voltage Vsys is stepped up is referred to as a rising rate, and a rate of change at which the input voltage Vsys is stepped down is referred to as a falling rate. In the timing diagram of FIG. 4, the rising rate and the falling rate are simply assumed to be constant. Practically, a time derivative of the input voltage Vsys may vary during stepping up or stepping down the input voltage Vsys. The SW speed is also assumed to be changed in two steps between a high speed and a low speed.

Each timing is denoted by a character string of three letters that begins with the letter "t". The second letters "u" and "d" respectively mean step-up and step-down of the input voltage Vsys. The second letters "r" and "a" respectively mean increase and reduction of the SW speed. The third letter "c" means output of a command.

The third letter "e" means completion of step-up or step-down of the actual value of the input voltage Vsys. The third letter "m" means a timing that the SW speed is changed by operation of the SW speed changing circuit 650 (see FIG. 2) in the inverter drive circuit 60 in response to the SW speed change command. An amount of time from the timing trc to the timing trm and an amount of time from the timing tac to the timing tam are referred to as reaction delays.

In the first embodiment, the control ECU 40 is configured to adjust an output order and a output time difference between the input voltage change command and the SW speed change command.

The control ECU 40 is configured to, when outputting the step-up command for stepping up the input voltage command Vsys*, output the step-up command a predetermined step-up wait time Tα after outputting the SW speed change command for reducing the SW speed.

The control ECU 40 is further configured to, when outputting the step-down command for stepping down the input voltage command Vsys*, output the SW speed change command for increasing the SW speed a predetermined speed-rise wait time Tβ after outputting the step-down command.

Referring to FIG. 4, the operations will now be described in more detail. In an initial condition, the input voltage Vsys is low (e.g., 300 V), and the SW speed is high. The example of FIG. 4 is directed to prioritizing prevention of the breakdown of the SW elements so that the input voltage Vsys never exceeds 300 V while the SW speed remains high.

When outputting the step-up command, the SW speed is switched from high to low at the time trm after a reaction delay DL from time trc at which the SW speed change command for reducing the SW speed is output. The step-up wait time Tα is set meet a condition (I) that the step-up wait time Tα is equal to or slightly greater than a maximum value within a range of variation in the reaction delay DL. Therefore, time tuc is the same time as time trm or immediately after time trm.

This allows the input voltage Vsys to start stepping up after completion of the switch of the SW speed from high to low, which can prevent breakdown of the SW elements.

When outputting the step-down command, stepping down of the input voltage Vsys is started at time tdc of outputting the step-down command. The SW speed change command for increasing the SW speed is output at time tac after a speed-rise wait time Tβ from time tdc. The SW speed is switched from low to high at time tam after the reaction delay DL from time tac.

The speed-rise wait time Tβ is set to meet a condition (II) that time tam that is the earlier time within the range of variation in the reaction delay DL is the same time as completion of stepping down of the input voltage Vsys or slightly delayed from the completion of stepping down of the input voltage Vsys. This allows the SW speed to be switched from low to high reliably after the completion of stepping down of the input voltage Vsys, which can prevent breakdown of the SW elements.

Minimizing the step-up wait time Tα and the speed-rise wait time Tβ that meet the above conditions (I) and (II) can reduce the losses as much as possible. When these settings are applied to the hybrid vehicle, the apparatus of the present embodiment can reduce the fuel economy.

In addition, even if the input voltage Vsys exceeds 300 V while the SW speed remains high, the SW elements may afford to withstand the breakdown within a voltage range up to a predetermined upper limit voltage (e.g. 350 V).

In such a case, setting the step-up wait time Tα and the speed-rise wait time Tβ based on a reference time that the input voltage Vsys reaches the upper-limit voltage can achieve the maximum loss reduction while suppressing the surge voltage.

Figure 5A:
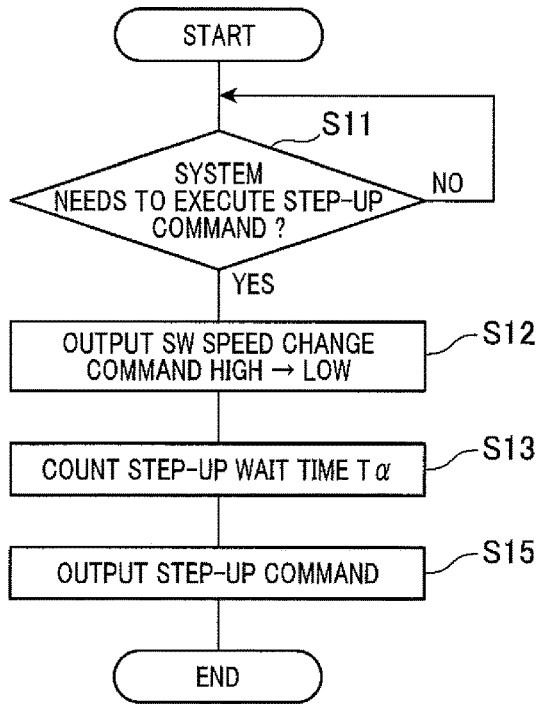
FIG. 5A is a flowchart of outputting a step-up command in accordance with the first embodiment.
Figure 5B:
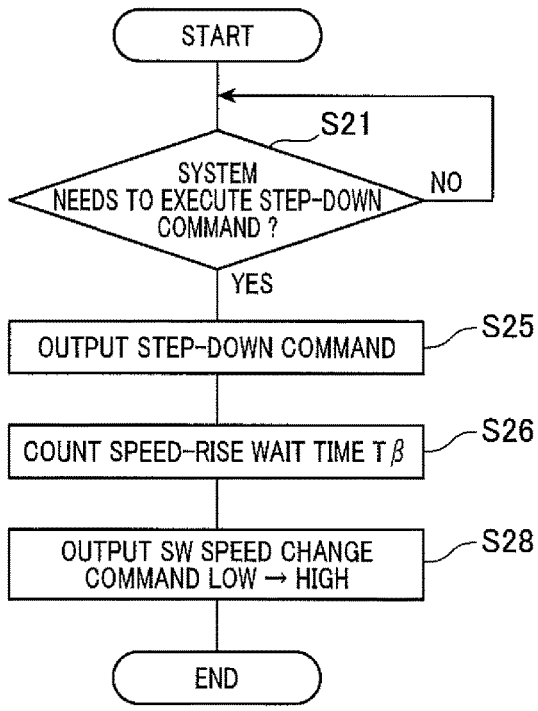
FIG. 5B is a flowchart of outputting a step-down command in accordance with the first embodiment.

FIG. 5A shows a flowchart of outputting the step-up command, and FIG. 5B shows a flowchart of outputting the step-down command.

Referring to FIG. 5A, if in step S11 it is determined that the system needs to execute the step-up command, then in step S12 the control ECU 40 outputs the SW speed change command for reducing the SW speed. In step S13, the control ECU 40 counts the time elapsed from time trc of outputting the SW speed change command. In step S15, the control ECU 40 outputs the step-up command at time tuc when the elapsed time becomes equal to the step-up wait time Tα.

Referring to FIG. 5B, if in step S21 it is determined that the system needs to execute the step-down command, then in step S25 the control ECU 40 outputs the step-down command. In step S26, the control ECU 40 counts the time elapsed from time tdc of outputting the step-down command. In step S28, the control ECU 40 outputs the SW speed change command for increasing the SW speed at time tac when the elapsed time becomes equal to the speed-rise wait time Tβ.

As above, the power conversion control apparatus 701 of the first embodiment adjusts an output order and an output time difference between the input voltage change command and the SW speed change command. This can avoid occurrence of a high input voltage and high SW speed situation and thereby prevent breakdown of the SW elements. In addition, minimizing the step-up wait time Tα and the speed-rise wait time Tβ can achieve the maximum loss reduction while suppressing the surge voltage.

Further, the inverter drive circuit 60 of the power conversion control apparatus 701 outputs to the control ECU 40 the SW speed change-completed notification indicative of completion of the SW speed change. Being aware of the completion of the SW speed change, the control ECU 40 can more readily control the timing of outputting the of the input voltage change command. In addition, the control ECU 40 can detect the presence or absence of a failure in the SW speed changing circuit 650 of the inverter drive circuit 60, which can enhance reliability of the overall system.

Second and Third Embodiments

The second and third embodiments will now be described with reference to FIGS. 6-9. In each of the second and third embodiments, the control ECU 40 is configured to, when the input voltage Vsys rises or falls and has reached a predetermined threshold, output the SW speed change command. The control ECU 40 is further configured to variably set the predetermined threshold, or a rising rate and a falling rate of the input voltage Vsys, so as to meet surge voltage suppression or loss reduction needs.

In the second embodiment, the control ECU 40 is configured to variably set the predetermined threshold. In the third embodiment, the control ECU 40 is configured to variably set the rising rate and the falling rate of the input voltage Vsys.

Figure 12:
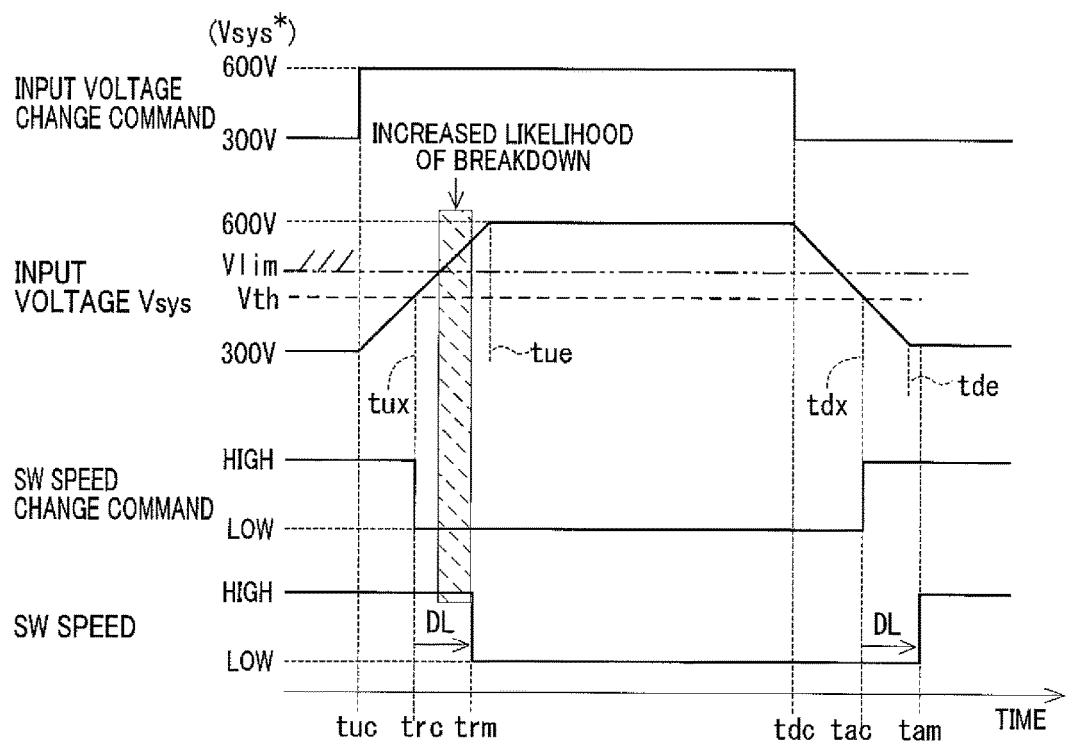
FIG. 12 is a comparative example of timing diagram for an input voltage command and a SW speed change command.

Before describing timing diagrams for outputting the input voltage change command and the SW speed change command in accordance with the second and third embodiments, a comparative example as disclosed in Japanese Patent No. 3052792 will now be explained with reference to FIG. 12.

A predetermined threshold Vth is set for the input voltage Vsys. In this timing diagram, the input voltage Vsys reaches the threshold Vth at time tux during stepping up the input voltage Vsys, and the input voltage Vsys reaches the same threshold Vth at time tdx during stepping down the input voltage Vsys. In the configuration of the gate drive circuit disclosed in Japanese Patent No. 3052792, the predetermined threshold during stepping up is set equal to the predetermined threshold during stepping down.

An upper limit of the input voltage Vsys that can ensure a withstand voltage margin for the SW elements when the SW speed is set high is denoted by Vlim. To prevent the breakdown of the SW elements, it is necessary to keep the SW speed low in a region where the input voltage Vsys is above the upper-limit voltage Vlim, thereby suppressing the surge voltage.

The input voltage Vsys reaches the threshold Vth at time tux during stepping up the input voltage Vsys. At the same time trc, the SW speed change command for reducing the SW speed is output. At time trm after the reaction delay DL from time trc, the SW speed is switched from high to low. At this time, the input voltage Vsys is already above the upper-limit voltage Vlim.

Therefore, in a region shown with dashed hatching, the SW speed is high and the input voltage Vsys is above the upper-limit voltage Vlim. Such a situation may cause the breakdown of the SW elements.

The input voltage Vsys reaches the threshold Vth at time tdx during stepping down the input voltage Vsys. At the same time tac, the SW speed change command for increasing the SW speed is output. At time tam after the reaction delay DL from time tac, the SW speed is switched from low to high. At this time, the input voltage Vsys is below the upper-limit voltage Vlim, where a sufficiently long time has already passed since disappearance of a risk of breakdown of the SW elements.

Therefore, although the losses could be more reduced if the SW speed was switched from low to high earlier, no attempt has been made. Application of this conventional technique to the hybrid vehicles may deteriorate the fuel economy.

Figure 6:
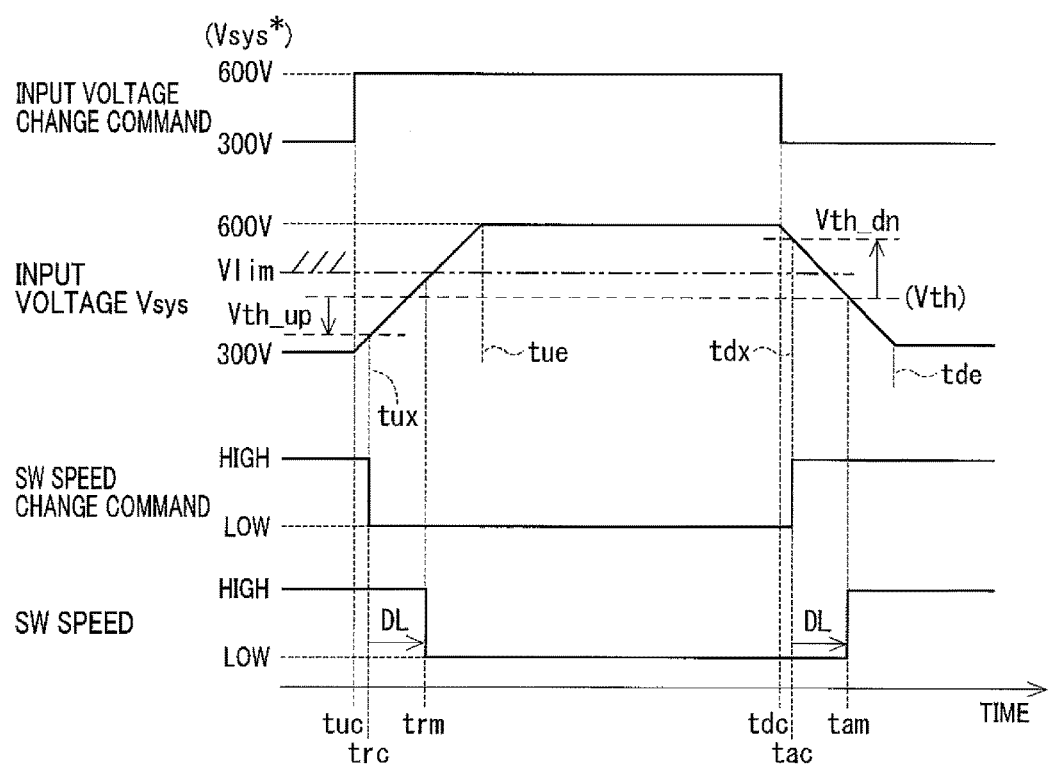
FIG. 6 is a timing diagram for an input voltage change command and a SW speed change command in accordance with the second embodiment.

The operations of the second embodiment will now be described with reference to the flowchart of FIG. 6. In the second embodiment, the control ECU 40 is configured such that a step-up threshold Vth_up and a step-down threshold Vth_dn are variably set. Preferably, the control ECU 40 is configured such that based on information about the reaction delay DL or the like the step-up threshold Vth_up is set below the threshold Vth of the above comparative example and the step-down threshold Vth_dn is set above the threshold Vth.

Time tux (=trc) that the input voltage Vsys reaches the step-up threshold Vth_up during stepping up the input voltage Vsys and the SW speed change command for reducing the SW speed is output is advanced as compared to the comparative example. Therefore, the input voltage Vsys at time trm that the SW speed is switched from high to low after the reaction delay DL from time tux (=trc) is below the upper-limit voltage Vlim. This can prevent breakdown of the SW elements.

Time tdx (=tac) that the input voltage Vsys reaches the step-down threshold Vth_dn during stepping down the input voltage Vsys and the SW speed change command for increasing the SW speed is output is also advanced as compared to the comparative example. Therefore, time tam that the SW speed is switched from low to high after the reaction delay DL from time tac will come soon after the input voltage Vsys falls below the upper-limit voltage Vlim. This can effectively reduce the losses and can improve the fuel economy of the hybrid vehicles.

Figure 7:
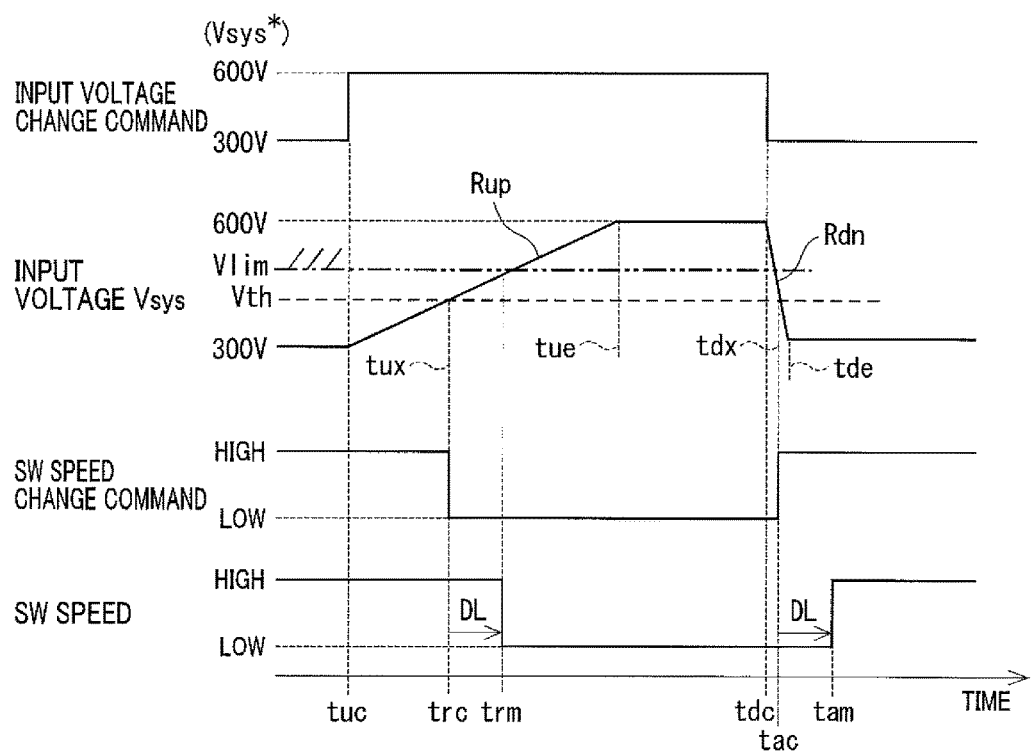
FIG. 7 is a timing diagram for an input voltage change command and a SW speed change command in accordance with the third embodiment.

The operations of the third embodiment will now be described with reference to a timing diagram of FIG. 7. In the third embodiment, the control ECU 40 is configured to variably set a rising rate Rup that is a rising slope of the input voltage Vsys and a falling rate Rdn that is a falling slope of the input voltage Vsys. Preferably, the control ECU 40 is configured to set the rising rate Rup to less than the falling rate Rdn based on information about the reaction delay DL. Step-up threshold Vth_up and the step-down threshold Vth_dn are the same and therefore denoted by the threshold Vth.

A time period from time tux (=trc) that the input voltage Vsys reaches the threshold Vth during stepping up the input voltage Vsys and the SW speed change command for reducing the SW speed is output to time that the input voltage Vsys reaches the upper limit voltage Vlim is increased. Therefore, the input voltage Vsys at time trm that the SW speed is switched from high to low after the reaction delay DL from time tux (=trc) is below the upper-limit voltage Vlim. This can prevent breakdown of the SW elements.

A time period from time tdc that the step-down command is output to time tdx (=tac) that the input voltage Vsys reaches the threshold Vth during stepping down the input voltage Vsys and the SW speed change command for increasing the SW speed is output is decreased. Therefore, time tam that the SW speed is switched from low to high after the reaction delay DL from time tac will be advanced. This can effectively reduce the losses and can improve the fuel economy of the hybrid vehicles.

Figure 8:
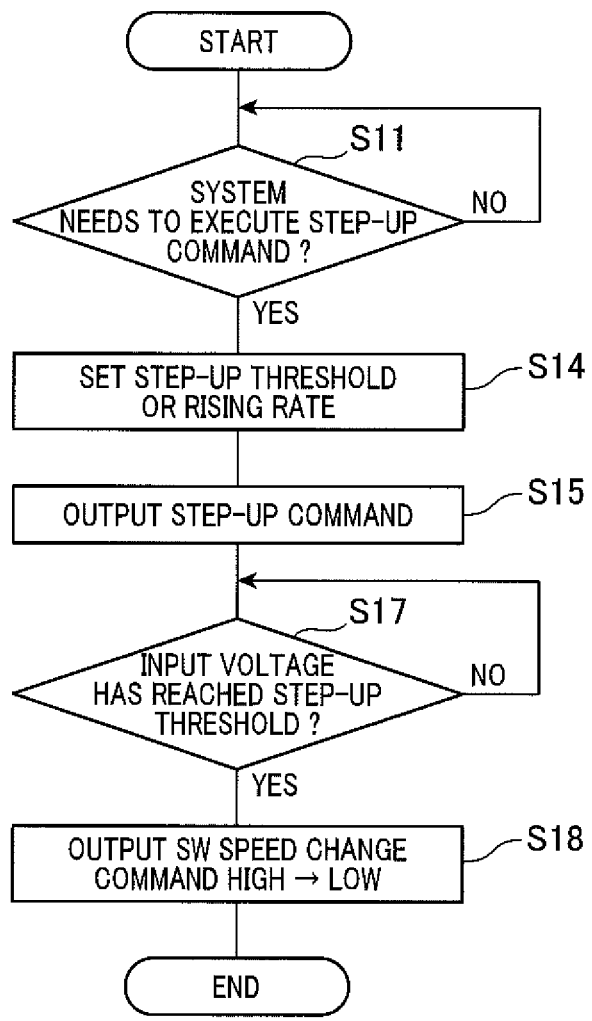
FIG. 8 is a flowchart of outputting a step-up command in accordance with each of the second and third embodiments.
Figure 9:
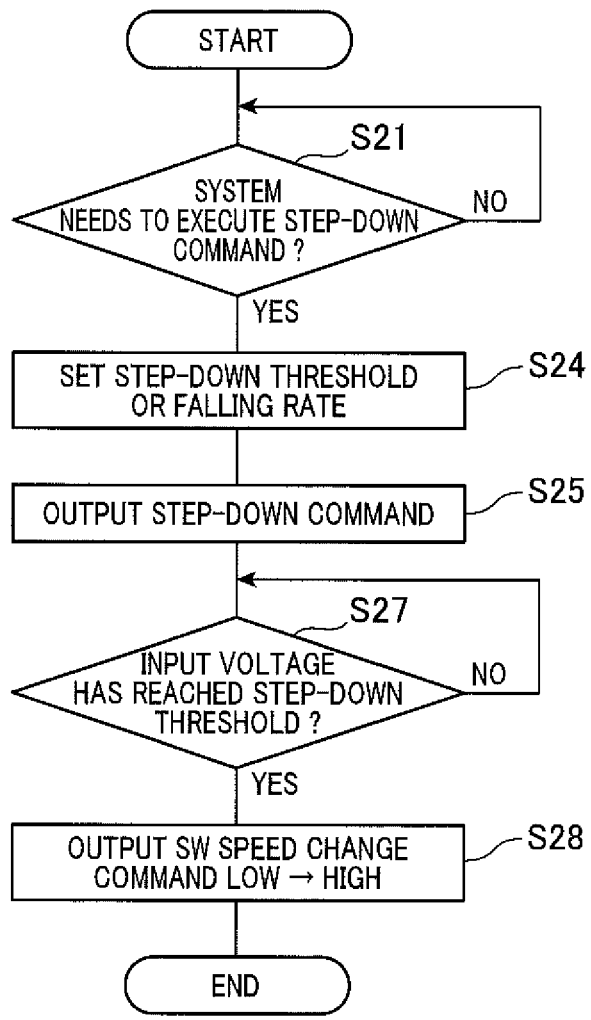
FIG. 9 is a flowchart of outputting a step-down command in accordance with each of the second and third embodiments.

FIG. 8 shows a flowchart of outputting the step-up command, and FIG. 9 shows a flowchart of outputting the step-down command, in accordance with each of the second and third embodiments.

Referring to FIG. 8, if in step S11 it is determined that the system needs to execute the step-up command, then in step S14 the control ECU 40 sets the step-up threshold Vth_up (in the second embodiment) or the rising rate Rup (in the third embodiment), and in step S15 outputs the step-up command at time tuc. If in step S17 the control ECU 40 determines that the input voltage Vsys rises and has reached the step-up threshold Vth_up (in the second embodiment) or the the threshold Vth (in the third embodiment) at time tux, the control ECU 40 outputs the SW speed change command for reducing the SW speed at the same time trc as time tux. The SW speed is switched from high to low at time trm after the reaction delay DL from time trc of outputting the SW speed change command.

Referring to FIG. 9, if in step S21 it is determined that the system needs to execute the step-down command, then in step S24 the control ECU 40 sets the step-down threshold Vth_dn (in the second embodiment) or the falling rate Rdn (in the third embodiment), and in step S25 outputs the step-down command at time tdc. If in step S27 the control ECU 40 determines that the input voltage Vsys falls and has reached the step-down threshold Vth_dn (in the second embodiment) or the threshold Vth (in the third embodiment) at time tdx, the in step S28 the control ECU 40 outputs the SW speed change command for increasing the SW speed at the same time tac as time tdx. The SW speed is switched from low to high at time tam after the reaction delay DL from time tac of outputting the SW speed change command.

As above, in each of the second and third embodiments, the control ECU 40 is configured to variably set the step-up threshold Vth_up and the step-down threshold Vth_dn, or the rising rate Rup and the falling rate Rdn of the input voltage Vsys, so as to meet surge voltage suppression or loss reduction needs. Therefore, each of the second and third embodiments can also provide similar advantages to those of the first embodiment.

In alternative embodiments, any combinations of the second and third embodiments can be envisaged. For example, the threshold and the rising rate and the falling rate may be variably set. In still alternative embodiments, variably setting the threshold and variably setting the rising rate and the falling rate may be switched.

Fourth Embodiment

Figure 10:
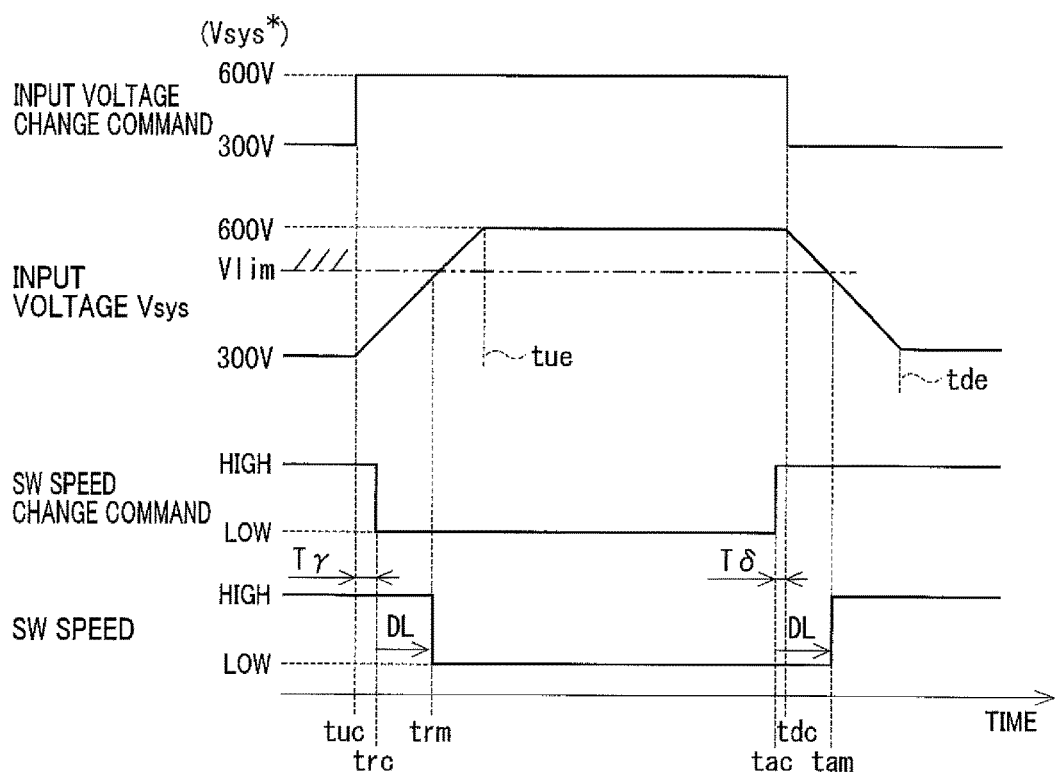
FIG. 10 is a timing diagram for an input voltage change command and a SW speed change command in accordance with the fourth embodiment.

A fourth embodiment will now be described with reference to FIG. 10. In the fourth embodiment, as in the first embodiment, the control ECU 40 is configured to adjust an output order and an output time difference between the input voltage change command and the SW speed change command except that these commands are output in reverse order to that of the first embodiment.

The control ECU 40 is configured to output the input voltage change command for stepping up the input voltage command Vsys* at time tuc and then output the SW speed change command for reducing the SW speed at time trc after a predetermined lapse of Tγ from time tuc. This output order is same as that of each of the second and third embodiments (see FIGS. 6 and 7).

In addition, the control ECU 40 is configured to output the SW speed change command for increasing the SW speed at time tac and then output the input voltage change command for stepping down the input voltage command Vsys* at time tdc after a predetermined lapse of Tδ from time tac.

At time trm that the SW speed is switched from high to low and at time tam that that the SW speed is switched from low to high, the input voltage Vsys is set to below the upper-limit voltage Vlim.

As described above, in the fourth embodiment, the input voltage change command and the SW speed change command are output in reverse order to that of the first embodiment, which can ensure a time period in which the SW speed is kept high as long as possible. Therefore, the fourth embodiment is directed to prioritizing the loss reduction.

Fifth Embodiment

Figure 11:
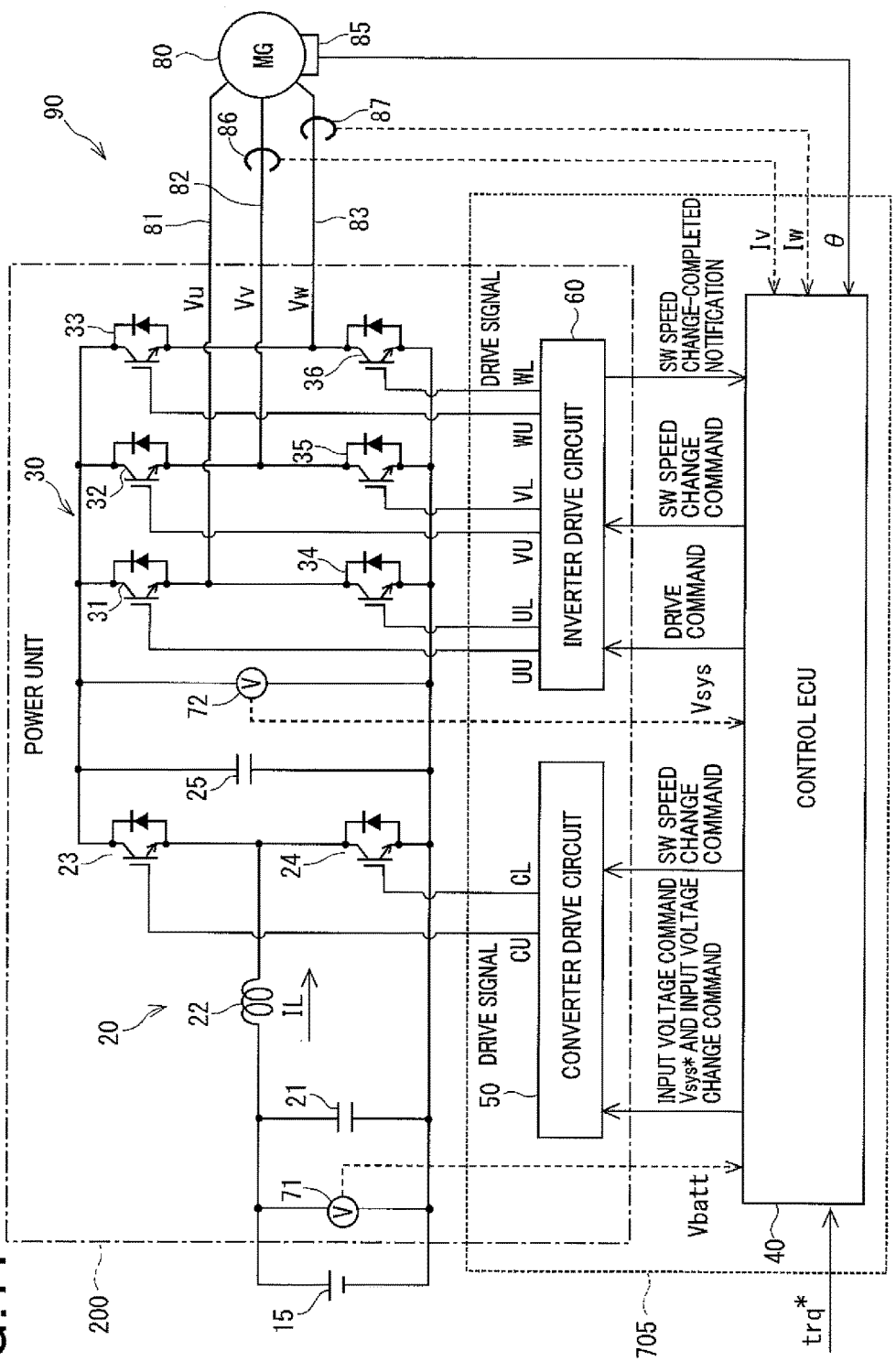
FIG. 11 is a schematic diagram of a power conversion system including a power conversion control apparatus in accordance with a fifth embodiment.

A fifth embodiment will now be described with reference to FIG. 11. In the power conversion control apparatus 705 of the fifth embodiment as shown in FIG. 11, not only the inverter drive circuit 60, but also the converter drive circuit 50 is configured to change the SW speed for the converter SW elements 23, 24. The control ECU 40 is configured to output to the converter drive circuit 50 a SW speed change command for changing the SW speed for the converter SW elements 23, 24.

A relationship between the input voltage Vsys and the withstand voltage margin shown in FIG. 3 are applicable not only to the inverter SW elements 31-36, but also to the converter SW elements 23,24. Therefore, the control ECU 40 outputting the SW speed change command not only to the inverter drive circuit 60, but also to the converter drive circuit 50, can also prevent the breakdown of the converter SW elements 23, 24 and reduce the losses in the converter SW elements 23, 24. Particularly, with such a configuration, the overall losses in the power conversion system 90 can be reduced.

Other Embodiments

The converter may be configured to have a circuit topology of another type of DC-DC converter. The inverter may be a multi-phase phase inverter, such as a four or more phase inverter.

The electrical load supplied with power from the inverter is not limited to the motor generator used as a power source for a hybrid vehicle or an electrical vehicle. The electrical load supplied with power from the inverter may be a vehicle accessory, a train, an elevating machine, or general machinery or the like other than automobiles. The electrical load may be a device other than a rotary machine. It is to be understood that the invention is not to be limited to the specific embodiments disclosed above and that modifications and other embodiments are intended to be included within the scope of the appended claims.

What is claimed is:

1. A power conversion control apparatus incorporated in a power conversion system for converting a direct current voltage output from a converter into an alternating current using an inverter, the apparatus being configured to control drive of the converter and the inverter, the apparatus comprising:

a converter drive circuit configured to drive the converter;
an inverter drive circuit configured to operate a plurality of switching elements forming the inverter at a variably set switching speed; and
a control electronic control unit (ECU) configured to output to the converter drive circuit an input voltage change command for changing an input voltage command for an input voltage to be output from the converter and input to the inverter, and output to the inverter drive circuit a drive command for driving the plurality of switching elements and a switching speed change command for changing the switching speed for the plurality of switching elements,
wherein the inverter drive circuit comprises a switching speed changing circuit for each switching element of the plurality of switching elements forming the inverter, the switching speed changing circuit being formed of a plurality of switching elements, each of which is connected to a different gate resistor having a different resistance, the inverter drive circuit being configured to select, based on the switching speed change command, between the plurality of switching elements of the switching speed changing circuit, and
the input voltage change command and the switching speed change command are timed to be output to the converter drive circuit and the inverter drive circuit, respectively, so as to avoid occurrence of a high input voltage and high switching speed situation,
wherein the control ECU is configured to, when changing the input voltage command to step up the input voltage, output the switching speed change command for reducing the switching speed, and then output the input voltage change command.

2. The apparatus of claim 1, wherein the control ECU is configured to output the input voltage change command after a lapse of a predetermined step-up wait time from when outputting the switching speed change command for reducing the switching speed.

3. The apparatus of claim 1, wherein
the control ECU is configured to variably set a step-up threshold or a rising rate of the input voltage, and
the control ECU is configured to, when the input voltage rises at the set rising rate and has reached the set step-up threshold, output the switching speed change command for reducing the switching speed.

4. The apparatus of claim 1, wherein
the control ECU is configured to variably set a step-down threshold or a falling rate of the input voltage, and
the control ECU is configured to, when the input voltage falls at the set falling rate and has reached the set step-down threshold, output the switching speed change command for increasing the switching speed.

5. The apparatus of claim 1, wherein the inverter drive circuit is configured to notice the control ECU of completion of changing the switching speed.

6. The apparatus of claim 1, wherein
the converter drive circuit is configured to change a switching speed for a plurality of switching elements forming the converter, and
the control ECU is further configured to output to the converter drive circuit a switching speed change command for changing the switching speed for the plurality of switching elements forming the converter, and
the converter drive circuit comprises a switching speed changing circuit for each switching element of the plurality of switching elements forming the converter, the switching speed changing circuit being formed of a plurality of switching elements, each of which is connected to a different gate resistor having a different resistance, the converter drive circuit being configured to select, based on the switching speed change command, between the plurality of switching elements of the switching speed changing circuit.

7. The apparatus of claim 3, wherein
the control ECU is configured to variably set a step-down threshold or a falling rate of the input voltage, and
the control ECU is configured to, when the input voltage falls at the set falling rate and has reached the set step-down threshold, output the switching speed change command for increasing the switching speed.

8. A power conversion control apparatus incorporated in a power conversion system for converting a direct current voltage output from a converter into an alternating current using an inverter, the apparatus being configured to control drive of the converter and the inverter, the apparatus comprising:
a converter drive circuit configured to drive the converter;
an inverter drive circuit configured to operate a plurality of switching elements forming the inverter at a variably set switching speed; and
a control electronic control unit (ECU) configured to output to the converter drive circuit an input voltage change command for changing an input voltage command for an input voltage to be output from the converter and input to the inverter, and output to the inverter drive circuit a drive command for driving the plurality of switching elements and a switching speed change command for changing the switching speed for the plurality of switching elements,
wherein the inverter drive circuit comprises a switching speed changing circuit for each switching element of the plurality of switching elements forming the inverter, the switching speed changing circuit being formed of a plurality of switching elements, each of which is connected to a different gate resistor having a different resistance, the inverter drive circuit being configured to select, based on the switching speed change command, between the plurality of switching elements of the switching speed changing circuit, and
the input voltage change command and the switching speed change command are timed to be output to the converter drive circuit and the inverter drive circuit, respectively, so as to avoid occurrence of a high input voltage and high switching speed situation,
wherein the control ECU is configured to, when changing the input voltage command to step down the input voltage, output the input voltage change command and then output the switching speed change command for increasing the switching speed.

9. The apparatus of claim 8, wherein the control ECU is configured to output the switching speed change command for increasing the switching speed after a lapse of a predetermined speed-rise wait time from when outputting the input voltage change command.

10. The apparatus of claim 8, wherein
the control ECU is configured to variably set a step-up threshold or a rising rate of the input voltage, and
the control ECU is configured to, when the input voltage rises at the set rising rate and has reached the set step-up threshold, output the switching speed change command for reducing the switching speed.

11. The apparatus of claim 8, wherein
the control ECU is configured to variably set a step-down threshold or a falling rate of the input voltage, and
the control ECU is configured to, when the input voltage falls at the set falling rate and has reached the set step-down threshold, output the switching speed change command for increasing the switching speed.

12. The apparatus of claim 8, wherein the inverter drive circuit is configured to notice the control ECU of completion of changing the switching speed.

13. The apparatus of claim 8, wherein
the converter drive circuit is configured to change a switching speed for a plurality of switching elements forming the converter, and
the control ECU is further configured to output to the converter drive circuit a switching speed change command for changing the switching speed for the plurality of switching elements forming the converter, and
the converter drive circuit comprises a switching speed changing circuit for each switching element of the plurality of switching elements forming the converter, the switching speed changing circuit being formed of a plurality of switching elements, each of which is connected to a different gate resistor having a different resistance, the converter drive circuit being configured to select, based on the switching speed change command, between the plurality of switching elements of the switching speed changing circuit.

14. The apparatus of claim 10, wherein
the control ECU is configured to variably set a step-down threshold or a falling rate of the input voltage, and
the control ECU is configured to, when the input voltage falls at the set falling rate and has reached the set step-down threshold, output the switching speed change command for increasing the switching speed.

* * * * *